(12) United States Patent
Suzuki

(10) Patent No.: US 8,472,667 B2
(45) Date of Patent: Jun. 25, 2013

(54) EDITING APPARATUS AND METHOD

(75) Inventor: Koichi Suzuki, Kodaira (JP)

(73) Assignee: Canon Kabushiki Kaisha (JP)

( * ) Notice: Subject to any disclaimer, the term of this patent is extended or adjusted under 35 U.S.C. 154(b) by 869 days.

(21) Appl. No.: 12/614,706

(22) Filed: Nov. 9, 2009

(65) Prior Publication Data

US 2010/0119177 A1    May 13, 2010

(30) Foreign Application Priority Data

Nov. 7, 2008 (JP) ................................. 2008-287177

(51) Int. Cl.
*G06K 9/00* (2006.01)
*G06K 9/36* (2006.01)
*G06K 9/20* (2006.01)
*H04N 5/225* (2006.01)
*H04N 5/228* (2006.01)

(52) U.S. Cl.
USPC ........... 382/103; 382/276; 382/312; 348/169; 348/208.16

(58) Field of Classification Search
USPC ................. 382/162, 167, 282, 283, 300, 305, 382/312, 103, 276, 307; 348/143, 155, 169, 348/192, 208.16, 208.99; 345/606
See application file for complete search history.

(56) References Cited

U.S. PATENT DOCUMENTS

| | | | |
|---|---|---|---|
| 6,768,563 B1 | 7/2004 | Murata et al. | |
| 7,423,667 B2 * | 9/2008 | Hayasaka | 348/143 |
| 7,777,780 B2 * | 8/2010 | Oya et al. | 348/208.1 |
| 8,098,282 B2 * | 1/2012 | Gopinath et al. | 348/143 |
| 8,098,904 B2 * | 1/2012 | Ioffe et al. | 382/118 |
| 8,212,872 B2 * | 7/2012 | Sablak | 348/143 |

FOREIGN PATENT DOCUMENTS

| | | |
|---|---|---|
| JP | 2002-142214 A | 5/2002 |
| JP | 2005117163 A | 4/2005 |
| JP | 2006319775 A | 11/2006 |

OTHER PUBLICATIONS

Japanese Office Action issued in Japanese counterpart application No. JP2008-287177, dated Nov. 22, 2012.

* cited by examiner

*Primary Examiner* — Kanjibhai Patel
(74) *Attorney, Agent, or Firm* — Rossi Kimms & McDowell LLP

(57) ABSTRACT

An apparatus for editing an image to be displayed on a display apparatus inputs a shot image. The apparatus detects a change in the input image, and edits the shot image so that a region corresponding to the detected change is not displayed on the display apparatus.

27 Claims, 13 Drawing Sheets

F I G. 13
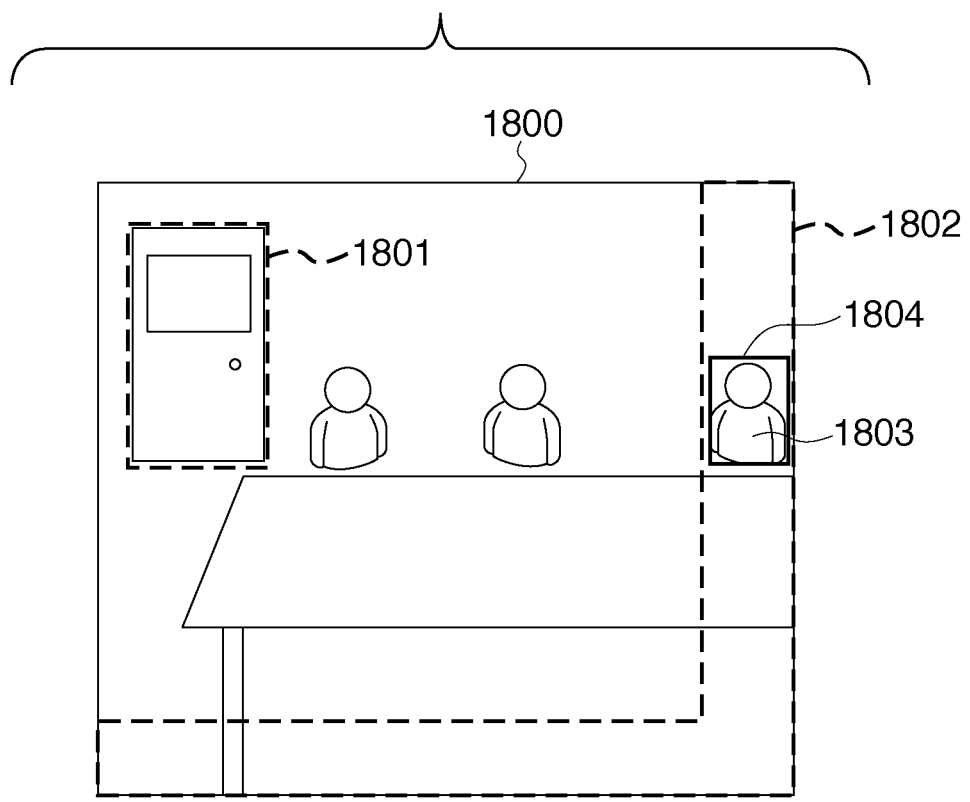
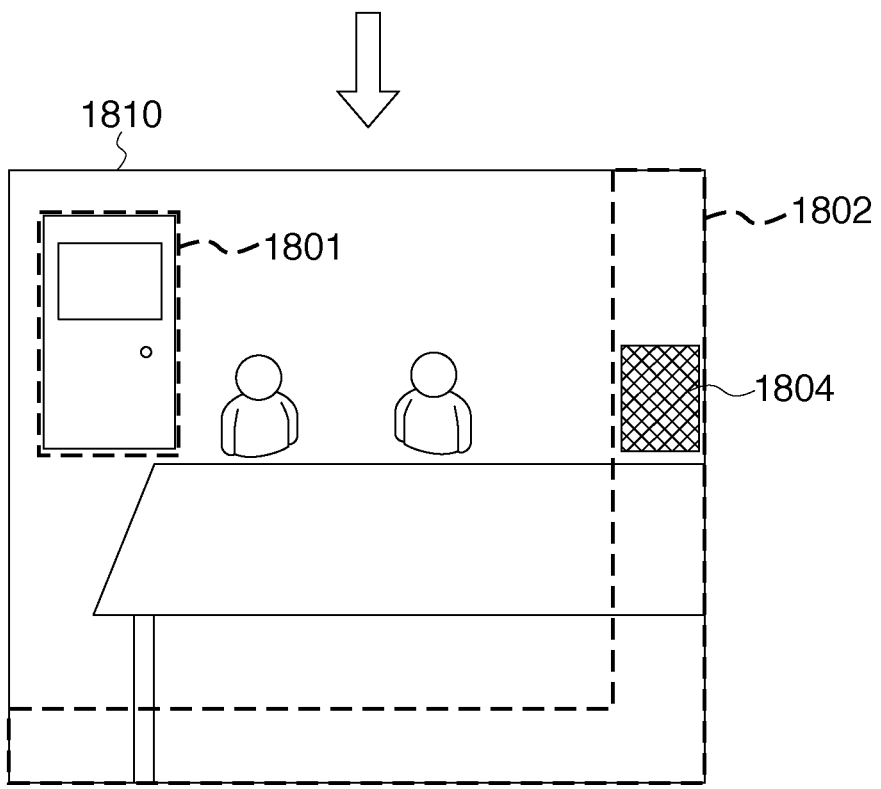

EDITING APPARATUS AND METHOD

BACKGROUND OF THE INVENTION

1. Field of the Invention

The present invention relates to an apparatus and a method for editing images displayed on a display apparatus.

2. Description of the Related Art

In recent years, a transmission apparatus for transmitting a video taken by a video camera or the like to a receiving party via the Internet or a dedicated line has been proposed and is being applied to videoconferencing, monitoring, and the like. With a transmission apparatus, a known method used when a part of the video is desirably hidden from another party for purposes of privacy and the like involves recognizing a moving object and masking the same.

For example, a technique described in U.S. Pat. No. 6,768,563 masks a region desirably hidden from another party in order to prevent objects included in the region from being displayed to the other party. However, with this method, an object desirably not displayed to the receiving party ends up being displayed once the object moves out of the region.

In addition, a technique described in Japanese Patent Laid-Open No. 2002-142214 prevents an object desirably hidden from another party from being displayed to the other party by having a user register the object in advance. However, with this method, there is a problem in that individually registering objects to be masked is troublesome and that objects on which a video cannot be prepared in advance cannot be registered.

Furthermore, both documents fail to mention a method for correctly recognizing and masking an object desirably hidden when an image capturing apparatus performs camera control such as pan, tilt, and zoom.

SUMMARY OF THE INVENTION

The present invention prevents an object desirably hidden from being displayed in a simple and secure manner.

In addition, the present invention provides an apparatus for editing an image to be displayed on a display apparatus comprising: an inputting unit for inputting a shot image; a detecting unit for detecting a change in an inputted image; and an editing unit for editing the shot image so as to prevent a region corresponding to the detected change from being displayed on the display apparatus.

Further features of the present invention will become apparent from the following description of exemplary embodiments with reference to the attached drawings.

BRIEF DESCRIPTION OF THE DRAWINGS

FIG. 13 is an exemplary illustrative diagram of clipping of an object according to the second embodiment of the present invention.

DESCRIPTION OF THE EMBODIMENTS

Hereinafter, embodiments of the present invention will be described with reference to the accompanying drawings.

First Embodiment

Figure 1:
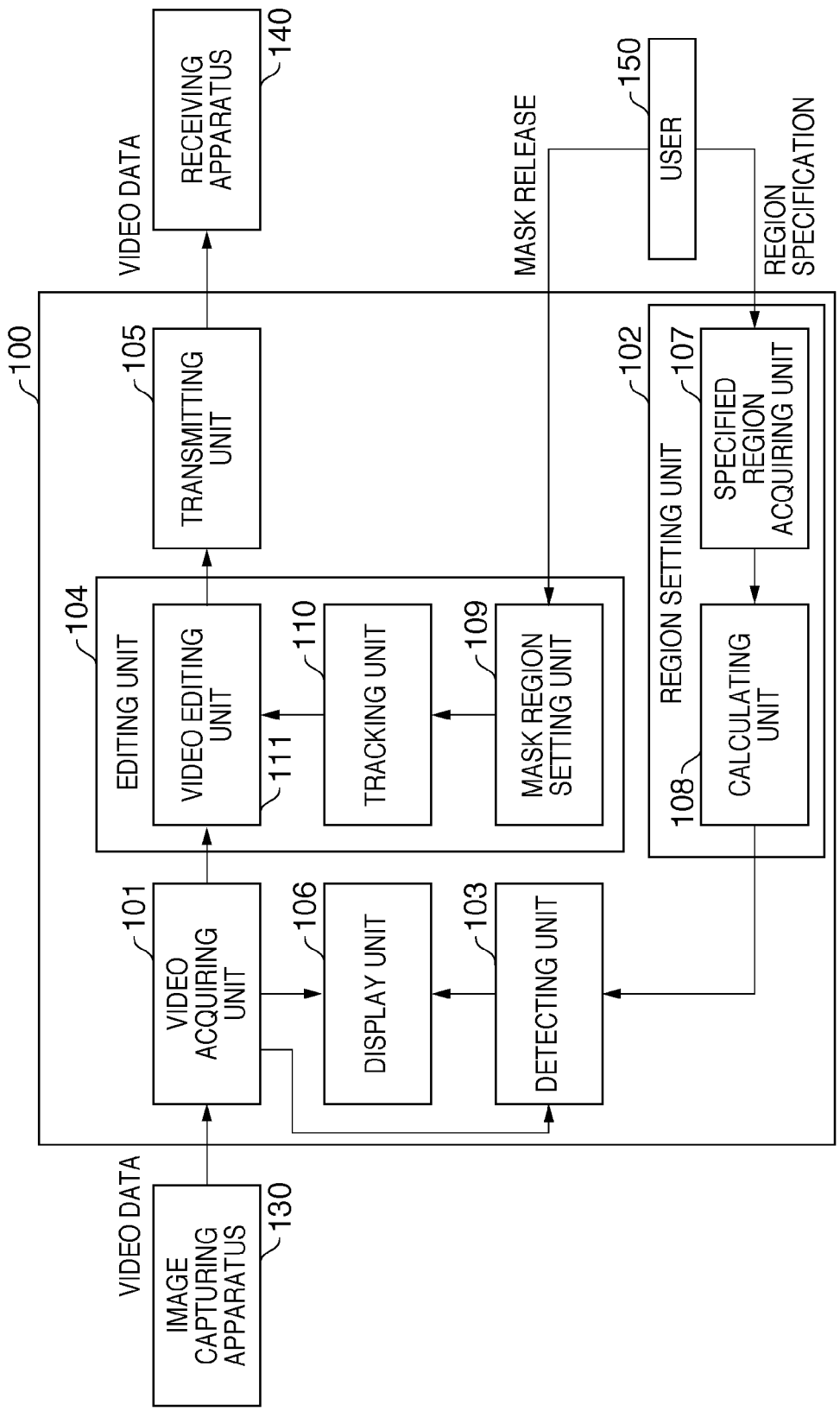
FIG. 1 is an exemplary functional block diagram of a transmission apparatus 100 according to a first embodiment of the present invention.

A transmission apparatus 100 according to a first embodiment will now be described with reference to FIGS. 1 and 2. FIG. 1 is an exemplary functional block diagram of the transmission apparatus 100 according to the present embodiment. The transmission apparatus 100 includes a video acquiring unit 101, a region setting unit 102, a detecting unit 103, an editing unit 104, a transmitting unit 105, and a display unit 106.

The video acquiring unit 101 acquires video data from an image capturing apparatus 130. Video data is data shot by the image capturing apparatus 130 and may either be acquired directly from the image capturing apparatus 130 or acquired via another device. In addition, instead of acquiring video data from the image capturing apparatus 130, the video acquiring unit 101 may read out video data stored in the transmission apparatus 100.

The region setting unit 102 sets a region for detecting an object not to be displayed at a receiving apparatus 140 among objects included in the video displayed by the video data. The region for detecting an object not to be displayed at the receiving apparatus 140 is called a detection region. The region setting unit 102 includes a specified region acquiring unit 107 and a calculating unit 108. The specified region acquiring unit 107 acquires a region specification that specifies a detection region from a user 150 of the transmission apparatus 100. A region specified as a detection region is called a specified region. The calculating unit 108 calculates a region to be set as a detection region in the video of the video data. In the present embodiment, a specified region shall be set without modification as a detection region.

The detecting unit 103 detects an object in a detection region in the video data acquired by the video acquiring unit 101. The object to be detected may be a movable object such as a person.

When the detecting unit 103 detects an object in the detection region, the editing unit 104 generates video data editing the region including the object such that the object is not displayed at the receiving apparatus 140. The editing unit 104 includes a mask region setting unit 109, a tracking unit 110, and a video editing unit 111. When the detecting unit 103 detects an object, the mask region setting unit 109 sets a region including the object as a mask region. In addition, the mask region setting unit 109 releases a mask region in response to a mask release instruction from the user 150. The tracking unit 110 tracks the movement of the object in a mask region and updates the mask region. The video editing unit 111 performs editing on video data acquired by the video acquiring unit 101 so as to mask a masking region.

The transmitting unit 105 transmits video data edited by the video editing unit 111 to the receiving apparatus 140 via a communication network or the like. Transmission to the receiving apparatus 140 may either be direct or indirect. For example, the transmitting unit 105 may transmit the edited video data to the receiving apparatus 140 in real time, or may asynchronously transmit a file of the edited video data to the receiving apparatus 140. For example, in a case where the video data to be transmitted by the transmission apparatus 100 is a television program, the receiving apparatus 140 may take the form of a television receiver. In a case where the video data to be transmitted by the transmission apparatus 100 is a video of a videoconference, the receiving apparatus 140 may take the form of a PC of a conference coparticipant. In addition, the transmitting unit 105 may transmit video data to a server, not shown, on a communication network, whereby the receiving apparatus 140 may acquire the video data from the server.

The display unit 106 displays video data acquired by the video acquiring unit 101, a mask region set by the mask region setting unit 109, and the like.

Figure 2:
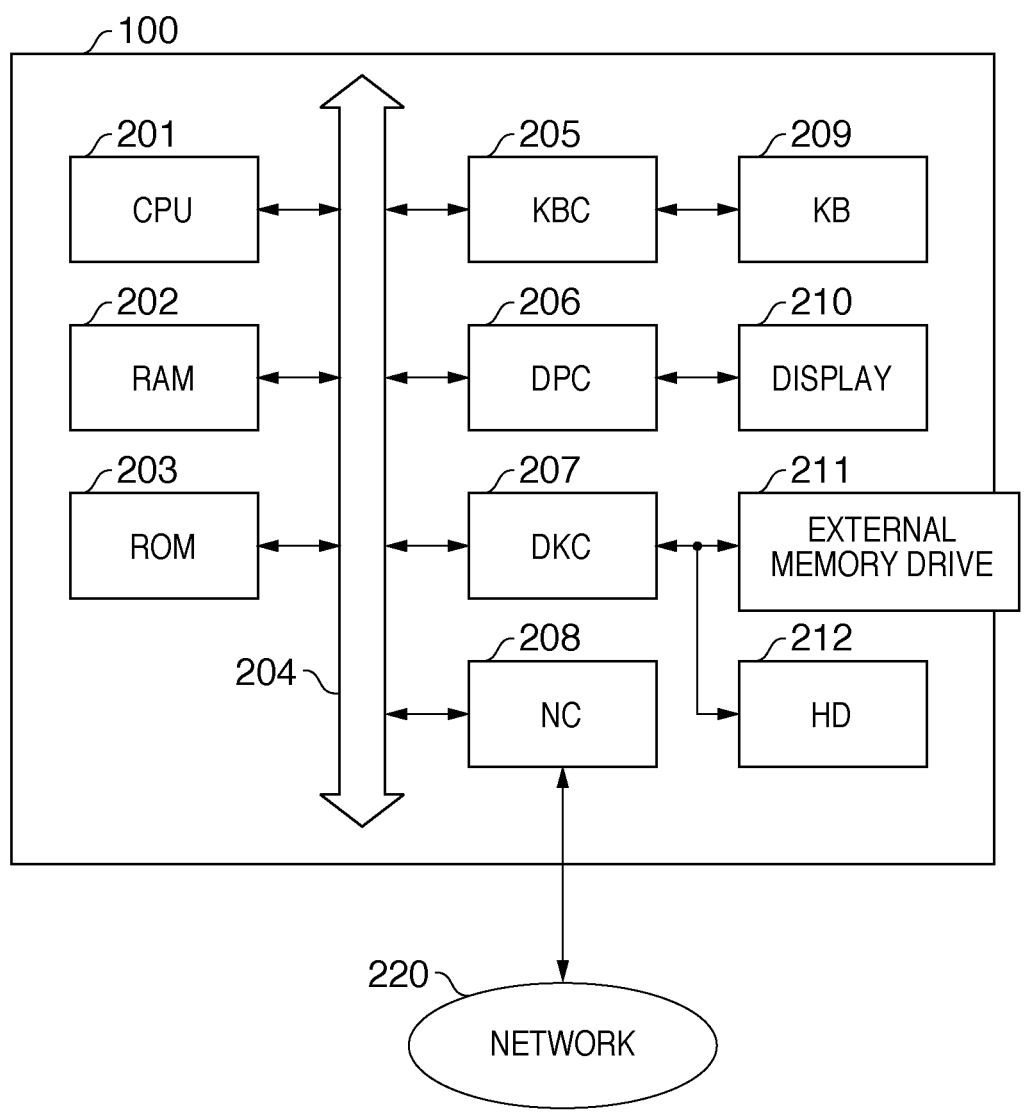
FIG. 2 is an exemplary hardware block diagram of the transmission apparatus 100 according to the first embodiment of the present invention.

FIG. 2 is an exemplary hardware block diagram of the transmission apparatus 100 according to the present embodiment. FIG. 2 shows a minimum configuration for realizing the configuration of the transmission apparatus 100 corresponding to the embodiments of the present invention. Other mechanisms associated with the transmission apparatus 100 have been omitted for simplicity.

A CPU 201 that is a microprocessor controls the transmission apparatus 100 based on a computer program, data, and the like stored in storage media set in a ROM 203, a hard disk (HD) 212, and an external memory drive 211.

A RAM 202 functions as a work area of the CPU 201 and retains a computer program stored in the ROM 203, the HD 212, and the like. The RAM 202 is also used to store temporary data such as detection region coordinates, various settings, and the like, which are described later. The ROM 203, a storage medium set into the external memory drive 211, or the HD 212 stores a computer program and the like such as that represented by the flow charts described below, which is to be executed by the CPU 201.

A keyboard controller (KBC) 205 controls input from a keyboard (KB) 209, a pointing device such as a mouse, a remote controller or the like, not shown. The KBC 205 functions as the specified region acquiring unit 107. In addition, the KBC 205 functions as a mask region setting unit 109 to be used by the user 150 to input a mask release instruction. A display controller (DPC) 206 controls display by a display 210. The display 210 functions as the display unit 106. A disk controller (DKC) 207 controls access to the HD 212 and the external memory drive 211, and reads/writes various programs as well as various data such as font data, user files, and edit files from/to the storage media.

A network controller (NC) 208 performs communication with a network 220. The NC 208 functions as the video acquiring unit 101 and the transmitting unit 105. Via the network 220, the video acquiring unit 101 acquires video data from the image capturing apparatus 130 and the transmitting unit 105 transmits video data to the receiving apparatus 140. Two NCs, namely, an NC for acquiring video data from the image capturing apparatus 130 and an NC for transmitting video data to the receiving apparatus 140 may be provided in the transmission apparatus 100. Moreover, unless a particular reference is made, it is assumed that the functions of the respective units shown in FIG. 1 are to be realized by the CPU 201.

The transmission apparatus 100 performs two types of operations, namely, a detection region setting operation and a video transmission operation. A detection region setting operation is an operation for setting a detection region. On the other hand, a video transmission operation is an operation for editing video data and transmitting the same to the receiving apparatus 140.

Figure 3:
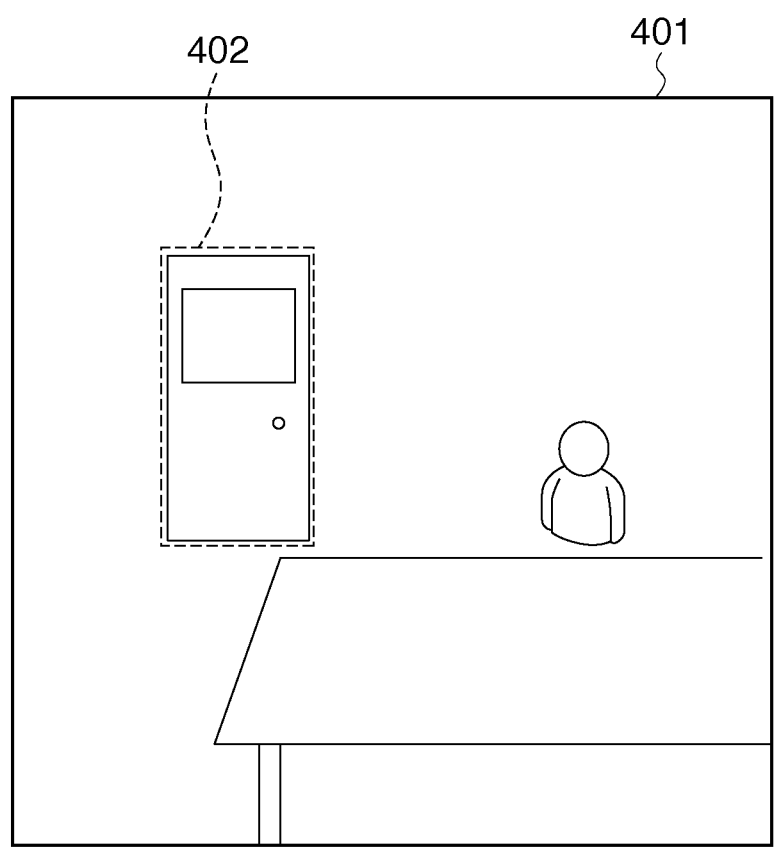
FIG. 3 is an exemplary illustrative diagram of an interface for detection region specification to be displayed on a display unit 106 according to the first embodiment of the present invention.

First, a detection region setting operation by the transmission apparatus 100 will be described with reference to FIG. 3. This operation is processed by the CPU 201 by executing a computer program read out to the RAM 202.

First, the video acquiring unit 101 acquires video data from the image capturing apparatus 130, and outputs the video data to the display unit 106. The display unit 106 displays an interface for detection region specification and, at the same time, the specified region acquiring unit 107 acquires a region specification from the user 150. FIG. 3 is an exemplary illustrative diagram of the interface for detection region specification to be displayed by the display unit 106 according to the present embodiment. A video 401 is a video at a given time in the video data acquired by the video acquiring unit 101, and shows conditions of a room that is the shooting subject. A region 402 is a specified region specified by the user 150. The user 150 specifies a specified region by moving the center position of the region 402 from side to side and up and down using an input device such as a remote controller or changing the horizontal and vertical lengths of the region 402. In FIG. 3, the region 402 covering an entrance to the room is specified as the specified region.

After region specification is completed by the user 150, the calculating unit 108 outputs information necessary for describing the region such as center position coordinates, horizontal length, and vertical length of the specified region 402 to the detecting unit 103 as detection region information. The specified region 402 by the user 150 is set as the detection region.

The specified region acquiring unit 107 determines whether or not all specified regions have been acquired. In the present embodiment, it is assumed that a plurality of regions can be specified. For example, the specified region acquiring unit 107 determines that the acquisition of specified regions has completed by accepting a completion instruction from the user 150. When it is determined that the specification of all detection regions has been completed, the transmission apparatus 100 terminates the detection region setting operation. On the other hand, when it is determined that the specification of a part of the detection regions has not been completed, specified regions are further acquired.

Figure 4:
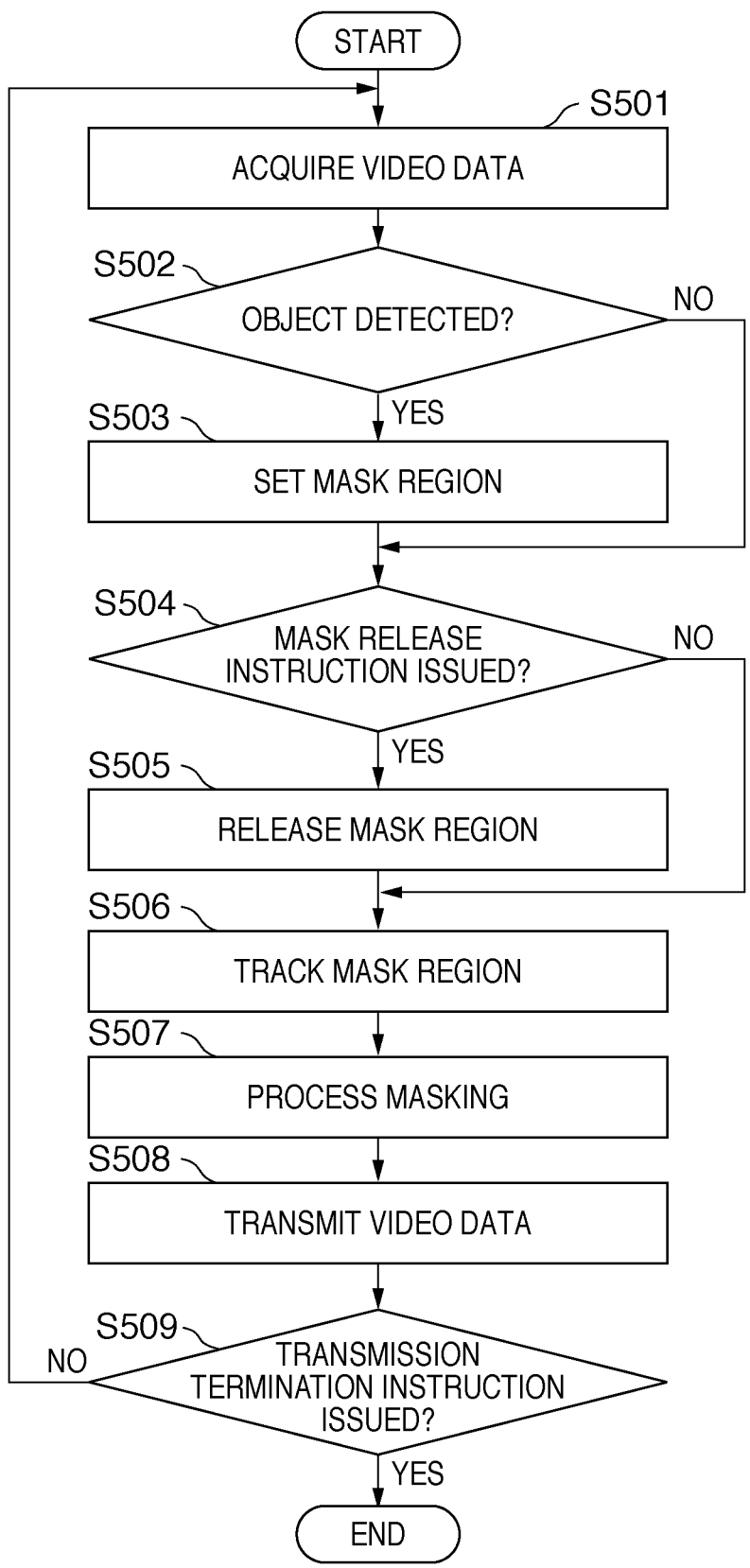
FIG. 4 is an exemplary illustrative flow chart of a video transmission operation by the transmission apparatus 100 according to the first embodiment of the present invention.
Figure 5:
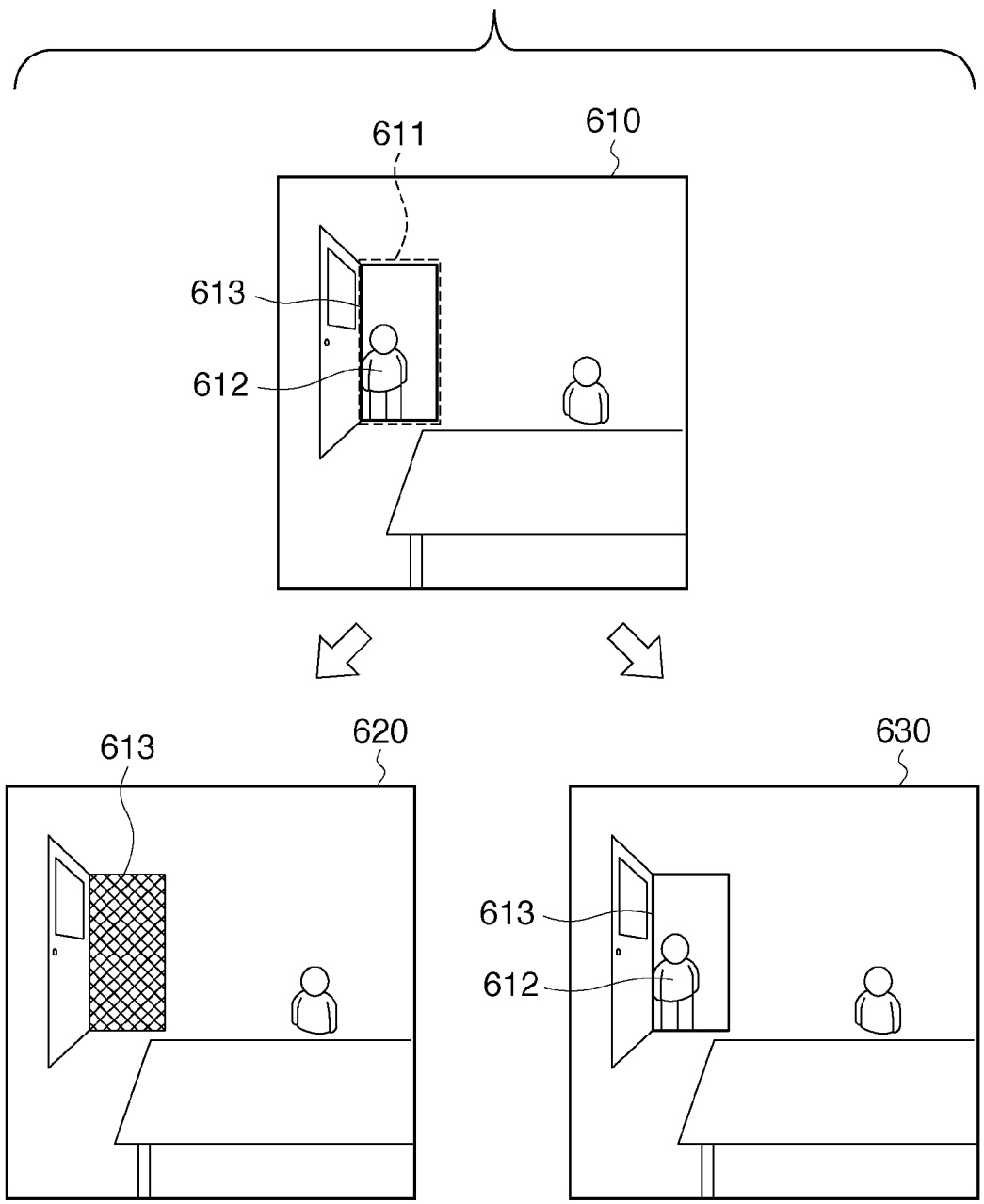
FIG. 5 is an exemplary illustrative diagram of a detection method of an object appearing in a video according to the first embodiment of the present invention.

Next, a video transmission operation by the transmission apparatus 100 will be described with reference to FIGS. 4 and 5. FIG. 4 is an exemplary illustrative flow chart of a video transmission operation by the transmission apparatus 100 according to the present embodiment. The operation described in the flow chart shown in FIG. 4 is processed by the CPU 201 by executing a computer program read out to the RAM 202.

In step S501, the video acquiring unit 101 acquires video data from the image capturing apparatus 130 and outputs the video data to the detecting unit 103 and the video editing unit 111. In step S502, the detecting unit 103 determines whether an object has been detected in the detection region or not. When it is determined that an object has been detected ("YES" in step S502), the operation proceeds to step S503. When it is determined that an object has not been detected ("NO" in step S502), the operation proceeds to step S504.

A detection method of an object appearing in a video will be described with reference to FIG. 5. FIG. 5 is an exemplary illustrative diagram of a detection method of an object appearing in a video according to the present embodiment. A video 610 is a video at a given time in the video data acquired in step S501. A detection region 611 is a detection region set by a detection region setting operation. A region covering an entrance of a room has been set. An object 612 is a person who has entered the room. The detecting unit 103 obtains a difference between data in the detection region 611 in the video 610 and data in the detection region 611 in a video acquired at a given time in the past. The detecting unit 103 detects the object 612 when the difference exceeds a threshold. In this manner, by comparing preceding and succeeding video data, the detecting unit 103 is able to detect the object 612.

Returning now to FIG. 4, in step S503, the display unit 106 highlights the region 613 including the object 612. Accordingly, the user 150 can now more easily recognize that the object 612 has been detected. While the region 613 may be the same as the detection region 611 as shown in the diagram, this need not necessarily be the case. The region 613 may have any size or shape as long as the object 612 is covered.

In addition, the mask region setting unit 109 sets the region 613 as a mask region. When doing so, the mask region setting unit 109 concurrently sets publication information indicating whether or not a video in the mask region 613 is to be displayed at the receiving apparatus 140. Publication information refers to information that takes a value of "public" when displaying a video in the mask region at the receiving apparatus 140 and "private" when not displaying the video. In the present embodiment, the initial value of publication information is set to "private". If the detected object 612 is smaller than the predetermined size, the object 612 may be determined to be a noise and may not be set as a mask region.

In step S504, the mask region setting unit 109 determines whether or not an instruction for releasing the mask has been received from the user 150 with respect to the set mask region. The user 150 references the highlight displayed by the display unit 106 in step S503 to decide whether or not to allow the object 612 in the region 613 to be displayed at the receiving apparatus 140. When allowing display, the user 150 gives the instruction for mask release through an input device such as a remote controller. When it is determined that an instruction has been received ("YES" in step S504), the operation proceeds to step S505 and the mask region setting unit 109 releases the setting of the mask region. Release is performed by changing the publication information of the set mask region from "private" to "public". On the other hand, when it is determined that an instruction has not been received ("NO" in step S504), the operation proceeds to step S506.

In step S506, the tracking unit 110 performs tracking on the set mask region. Details of tracking of the mask region will be described later.

In step S507, the video editing unit 111 performs masking on the mask region whose publication information is set to "private" among the video data, and outputs the edited video data to the transmitting unit 105. A video 620 shown in FIG. 5 is a video to be outputted to the transmitting unit 105 in the case where mask release is not performed in step S504. Since the publication information of the mask region 613 is "private", the mask region 613 has been masked and a video in the mask region 613 is arranged so as not to be displayed at the receiving apparatus 140. Therefore, a user of the receiving apparatus 140 is unable to observe the object 612.

On the other hand, a video 630 is a video to be output to the transmitting unit 105 in the case where mask release is performed in step S504. Since the publication information of the mask region 613 has been changed to "public" in step S505, the masking of the mask region 613 has been released and a video in the mask region 613 is arranged so as to be displayed at the receiving apparatus 140. Therefore, the user of the receiving apparatus 140 is able to observe the object 612.

In step S508, the transmitting unit 105 transmits the edited video data to the receiving apparatus 140. In step S509, a whether an instruction for video transmission termination from the user 150 has been received or not is determined. When it is determined that a termination instruction has been received ("YES" in step S509), the video transmission operation is terminated. When it is determined that a termination instruction has not been received ("NO" in step S509), the operation returns to step S501 to acquire video data of a next time point.

Figure 6:
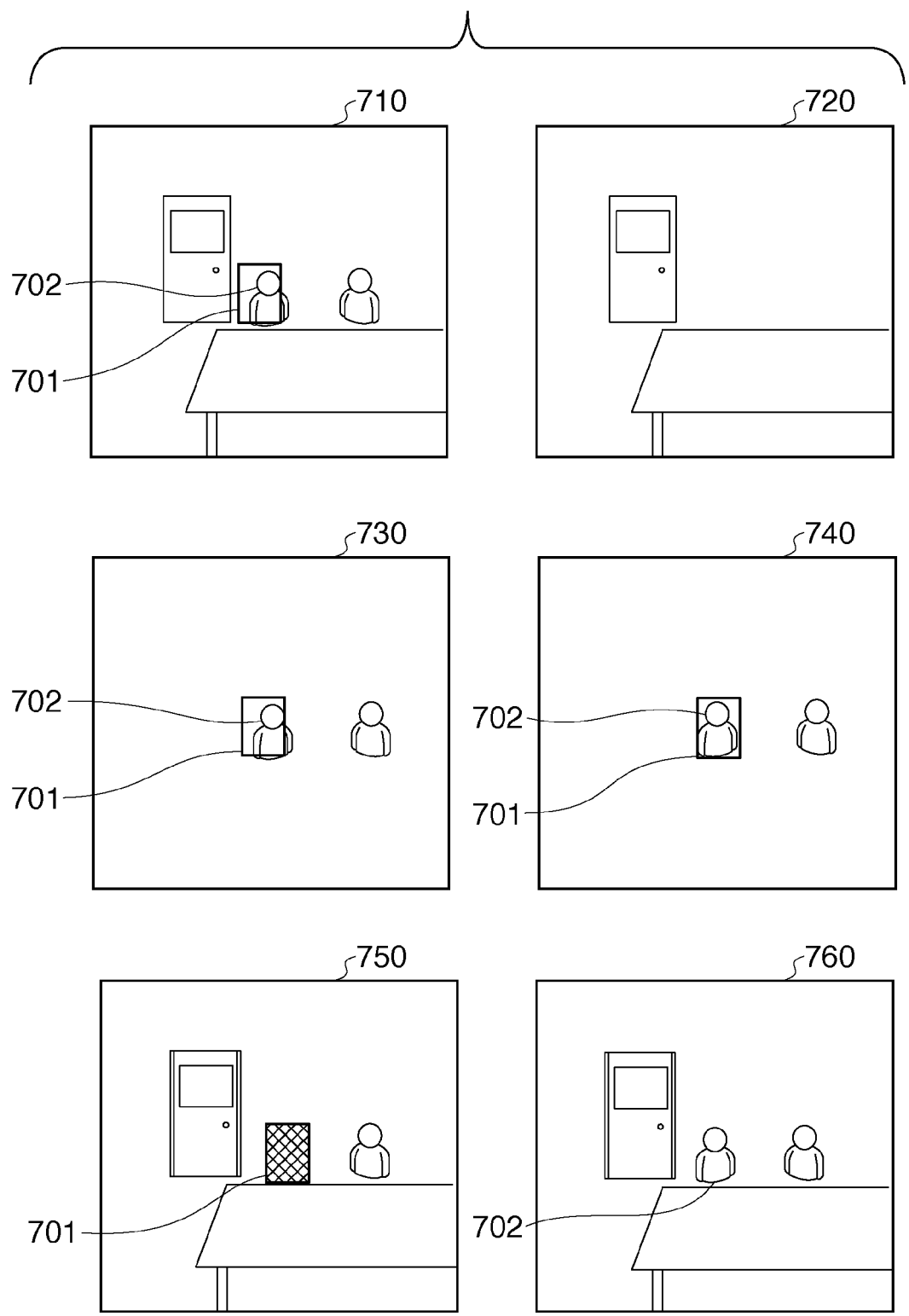
FIG. 6 is an exemplary illustrative diagram of the status of a video of an object moving with time and processing thereof according to the first embodiment of the present invention.

Next, mask region tracking performed in step S506 will be described in detail with reference to FIG. 6. FIG. 6 is an exemplary illustrative diagram of the status of a video of an object moving with time and processing thereof.

A video 710 is a video at time T in the video data. A person having entered through the entrance is shown having since moved and now seated. A mask region 701 is a mask region at time T−1. An object 702 is an object detected at time T. Since the object 702 has moved from time T−1 to time T, the object 702 is now protruding outside of the mask region 701. Therefore, the video data cannot be transmitted as-is to the receiving apparatus 140.

A background video 720 is a video of a background of the room that is a shooting subject. The background video 720 is to be acquired in advance and stored in the RAM 202 or the like. The acquisition of the background video 720 can be performed in any way. For example, the background video 720 may be created during video transmission by using a median of pixel values of respective pixels at the same pixel position in a predetermined number of temporally consecutive frames in video data acquired by the video acquiring unit 101 as a pixel value at the same pixel position of the background video 720.

An example of mask region tracking performed in step S506 shown in FIG. 4 will now be described in detail. This operation is processed by the CPU 201 by executing a computer program read out to the RAM 202.

First, a differential video 730 of the video 710 at time T and the background video 720 is calculated. As shown in FIG. 6, only a video of a person and the mask region 701 are extracted in the differential video 730. Next, pattern matching is performed using the object 702 at time T−1 on a neighborhood region of the mask region 701 in the differential video 730 to determine a position of the object 702 at time T.

The mask region 701 is moved in accordance with the object 702 determined as described above and the position of the mask region 701 is updated. A differential video in which the position of the mask region 701 has been updated in this manner is a differential video 740 shown in FIG. 6. Subsequently, the video editing unit 111 generates an edited video 750 at time T by superimposing the differential video 740 on the background video 720. In the video 750, since the mask region 701 has also moved in association with the movement of the object 702, a state is maintained in which the object 702 is not displayed on the receiving apparatus 140.

On the other hand, in the case where a release instruction of the mask region 701 has been issued at time T, video data to be output from the video editing unit 111 is as shown as a video 760. In this manner, even during video data transmission, a change can be made to a state where the object 702 is to be displayed on the receiving apparatus 140.

The tracking unit 110 can be arranged so as to track the size of the object 702 in addition to the position thereof. In other words, when the size of the object 702 changes to the extent where the object 702 no longer fits into the mask region 701, the tracking unit 110 automatically enlarges the mask region 701. As described above, in the present embodiment, even when an object that is a detection subject moves and deviates from the range of an original detection region, the object that is the detection subject can be arranged so as not to be displayed to a transmission destination.

In the present embodiment, while the video editing unit 111 is arranged so as not to display an object by masking a video in the mask region, editing according to the present invention need not necessarily be limited to such an arrangement. For example, in another embodiment, the video editing unit 111 replaces a video in a mask region with a previously-acquired video such as a background video.

In addition, while an example has been described for the present embodiment in which a person is detected as an object, an object need not necessarily be a person and may instead be any entity whose position or shape changes with time.

While the present embodiment has been configured such that publication information is provided in a mask region and that masking is to be performed only when the value of the publication information is "private", the method of providing publication information according to the present invention need not be limited thereto. For example, the mask region may be arranged so as not to have publication information, whereby a mask region is deleted when a mask release instruction is issued in step S505 shown in FIG. 4 and masking is performed on all existing mask regions in step S507.

Furthermore, while a case where there are two types of publication information, namely, "public" and "private", has been described in the present embodiment, types of publication information according to the present invention is not limited thereto. For example, three or more types of publication information may be provided, whereby publication or concealment may be switched depending on the authority of the receiving apparatus 140.

Figure 7:
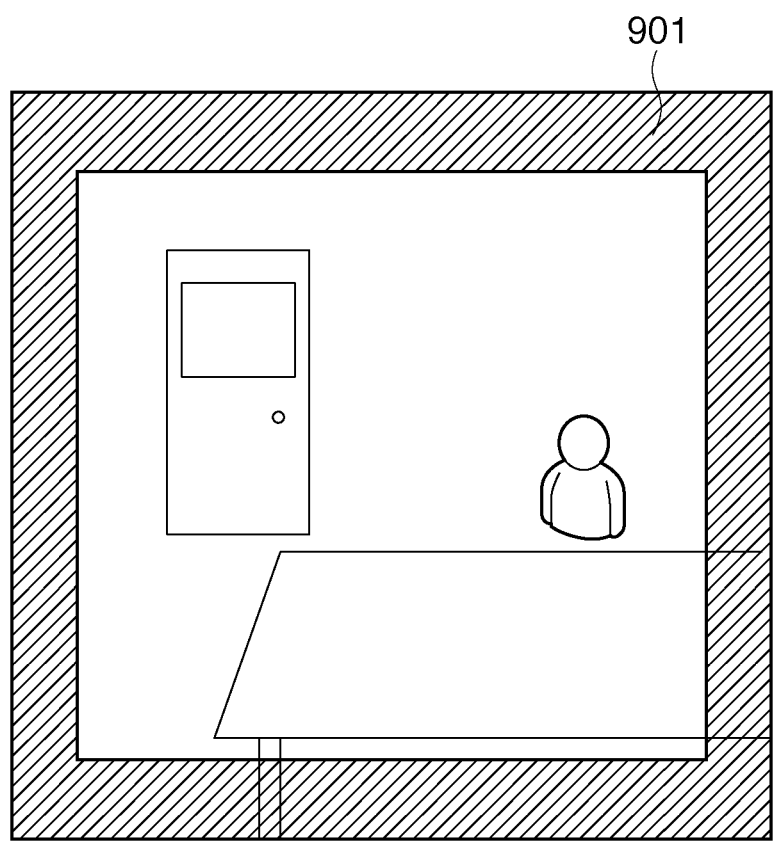
FIG. 7 is another exemplary illustrative diagram of detection region setting according to an embodiment of the present invention.

Moreover, while an example has been described for the present embodiment in which a detection region is a rectangular region within a video, the shape of a detection region need not necessarily be limited thereto. For example, by specifying an edge peripheral region such as a shaded region 901 shown in FIG. 7, an object intruding from outside of the video may be arranged so as not to be displayed. FIG. 7 is another exemplary illustrative diagram of detection region setting. In addition, while an example has been described for the present embodiment in which one detection region is provided, a plurality of regions may be set as detection regions.

Furthermore, while the transmission apparatus 100 according to the present invention has been described using a configuration in which video data is to be received from the outside, advantages of the present invention can be similarly achieved by integrally configuring a video data output source such as the image capturing apparatus 130 with the transmission apparatus 100. Moreover, the transmission apparatus 100 may transmit edited video data in real-time to the receiving apparatus 140 while acquiring the video data, or transmit edited video data to the receiving apparatus 140 after saving the entire video data.

In addition, while a case has been described for the present embodiment in which an object moves, besides movement, an object may be accompanied by any kind of change including a size change which causes a change in a region occupied by the object among the video data. A mask region is to be set so as to cover the changed object.

Second Embodiment

In the first embodiment, a case has been described in which an area shot by the image capturing apparatus 130 remains unchanged. However, in a case where the image capturing apparatus 130 includes a pan/tilt mechanism, a zoom mechanism, or the like, a shooting area may change within video data. In such a case, it is possible that an object desirably not displayed at the receiving apparatus 140 be shown in a region newly included in the shooting area. For example, when video data is acquired in real time and detection regions are sequentially specified, it is difficult for the user 150 to specify, in advance, a region to be newly included in the shooting area as a detection region. In consideration thereof, in a second embodiment, a configuration will be described in which the transmission apparatus 100 automatically sets a region to be newly included in a video area as a detection region. It should be noted that components shared by the first embodiment shall be denoted by same reference numerals and that descriptions thereof shall be omitted.

Figure 8:
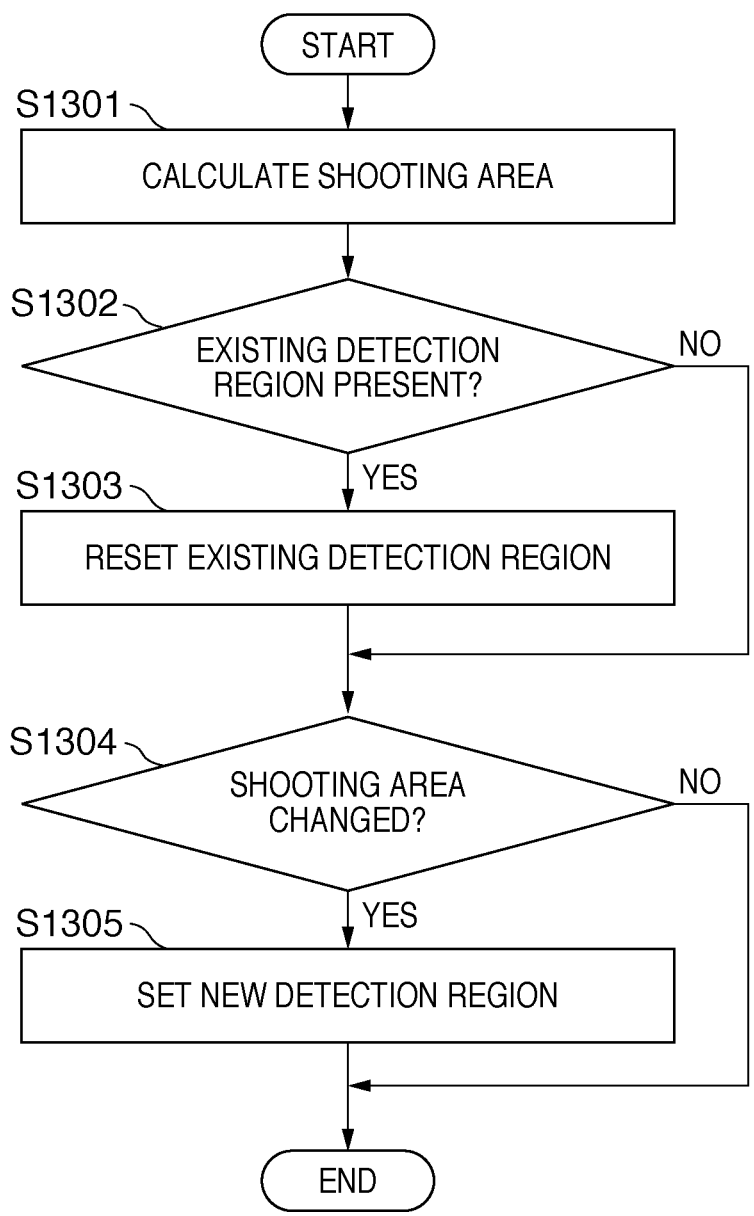
FIG. 8 is an exemplary illustrative flow chart of operations by a calculating unit 108 according to a second embodiment of the present invention.

The transmission apparatus 100 according to the present embodiment shall be described with reference to FIG. 8. Since a functional block diagram and a hardware block diagram according to the present embodiment are similar to those of the first embodiment, only differences will be described hereinafter. In the transmission apparatus 100 according to the present embodiment, the calculating unit 108, the detecting unit 103, and the tracking unit 110 operate differently from the first embodiment.

In addition to operations described in the first embodiment, the calculating unit 108 acquires imaging control information from the image capturing apparatus 130. Imaging control information is a parameter that decides a shooting area of the image capturing apparatus 130 and includes: a maximum pan angle; a maximum tilt angle; a pan angle, a tilt angle, and a zoom relative magnification of the image capturing apparatus 130 at the time of shooting; and an angle of view of a wide angle end of the image capturing apparatus 130. The calculating unit 108 further calculates a shooting region based on imaging control information acquired from the image capturing apparatus 130 and sets a region newly included in the shooting area as a detection region.

In addition to operations described in the first embodiment, the detecting unit 103 compares a video at the time of processing with a background video to clip a region including an object, and calculates a mask region. In addition to operations described in the first embodiment, the tracking unit 110 enhances the accuracy of tracking an object by performing motion compensation on a mask region based on imaging control information.

Next, operations of the transmission apparatus 100 according to the present embodiment will be described. Since the detection region setting operation by the transmission apparatus 100 is similar to that of the first embodiment, a description thereof shall be omitted. The video transmission operation by the transmission apparatus 100 will now be described with reference to FIG. 4.

The second embodiment differs from the first in step S502 and step S506. In step S502, the region setting unit 102 calculates a detection region. In the present embodiment, since there are cases where a shooting area is to be changed by the image capturing apparatus 130, the region setting unit 102 also includes a region to be newly included in the shooting area in the detection region. In addition, when a detection region set by the user 150 deviates from the shooting area in association with a change in the shooting area, the region setting unit 102 excludes the detection region from a detection subject. Details will be provided later. Furthermore, in addition to operations described in the first embodiment, in step S502, a region including an object is clipped and a mask region is calculated. Details will be provided later.

Moreover, in addition to operations described in the first embodiment, in step S506, the accuracy of tracking an object is enhanced by performing motion compensation on a mask region based on imaging control information. Details will be provided later.

Next, details of the detection region setting processing to be executed in step S502 shown in FIG. 4 will be described with reference to FIGS. 8 to 11.

Details of operations of the calculating unit 108 will be described with reference to FIG. 8. FIG. 8 is an exemplary illustrative flow chart of operations by the calculating unit 108 according to the present embodiment. The operations described in the flow chart shown in FIG. 8 are processed by the CPU 201 by executing a computer program read out to the RAM 202.

In step S1301, the calculating unit 108 acquires imaging control information from the image capturing apparatus 130, and based on the imaging control information, calculates relative position coordinates of a shooting region in a panorama video. The imaging control information includes: a maximum pan angle φmax and a maximum tilt angle θmax; a pan angle φ, a tilt angle θ, and a zoom relative magnification γ when the wide angle end of the image capturing apparatus 130 is at 1× magnification at the time of shooting; and a horizontal angle of view λ and a vertical angle of view μ of the wide angle end of the image capturing apparatus 130.

Figure 9:
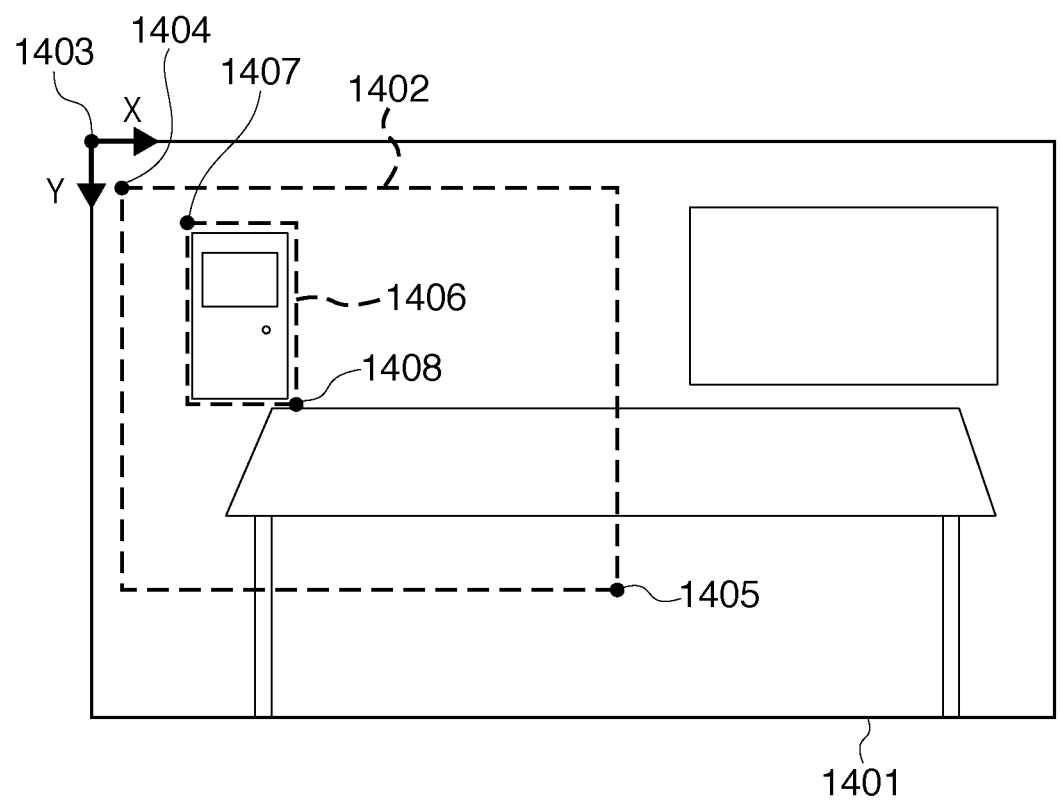
FIG. 9 is an exemplary illustrative diagram of a panoramic coordinate system according to the second embodiment of the present invention.

A method of calculating a shooting region in a panorama video based on image control information will now be described with reference to FIG. 9 and to FIGS. 10A to 10C. FIG. 9 is an exemplary illustrative diagram of a panoramic coordinate system according to the present embodiment. A panorama video 1401 is a video presenting a total region that can be shot by the image capturing apparatus 130. A shooting region 1402 represents an area shot by the image capturing apparatus 130 at a given time. A state of a portion of a room that is a shooting subject is shown. Taking the top left point 1403 of the panorama video 1401 as an origin, a coordinate system whose X axis is horizontal rightward and Y axis is vertical downward is referred to as a panoramic coordinate system. A coordinate in the panoramic coordinate system is referred to as a panoramic coordinate. Coordinates of a top left point 1404 and a bottom right point 1405 of the shooting region 1402 in the panoramic coordinate system are to be respectively expressed as $$P_{1404}\begin{bmatrix}X\\Y\end{bmatrix}, P_{1405}\begin{bmatrix}X\\Y\end{bmatrix}.$$

While the entire panorama video 1401 is shown in the present embodiment, this is simply done for convenience and does not imply that the panorama video 1401 itself is required for deciding a panoramic coordinate. As will be described later, the calculating unit 108 is capable of deciding a panoramic coordinate using imaging control information.

Figure 10A:
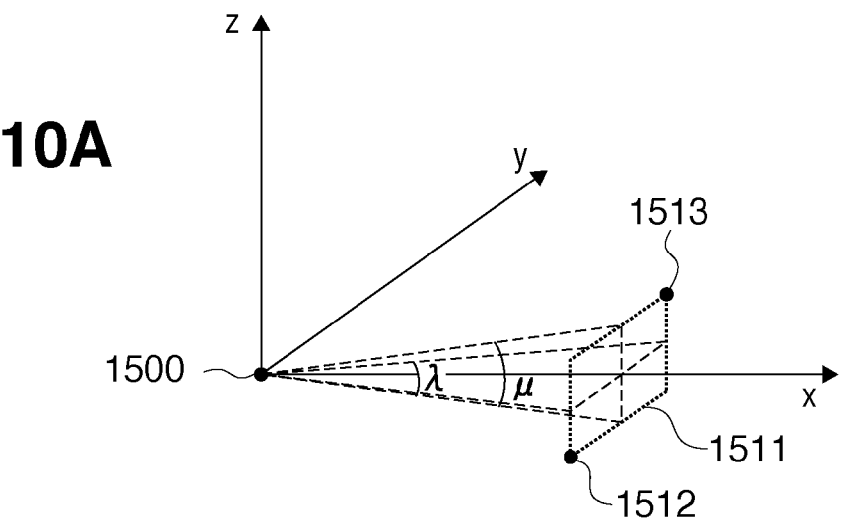
FIGS. 10A to 10C are exemplary illustrative diagrams of a panoramic coordinate calculation method according to the second embodiment of the present invention.
Figure 10B:
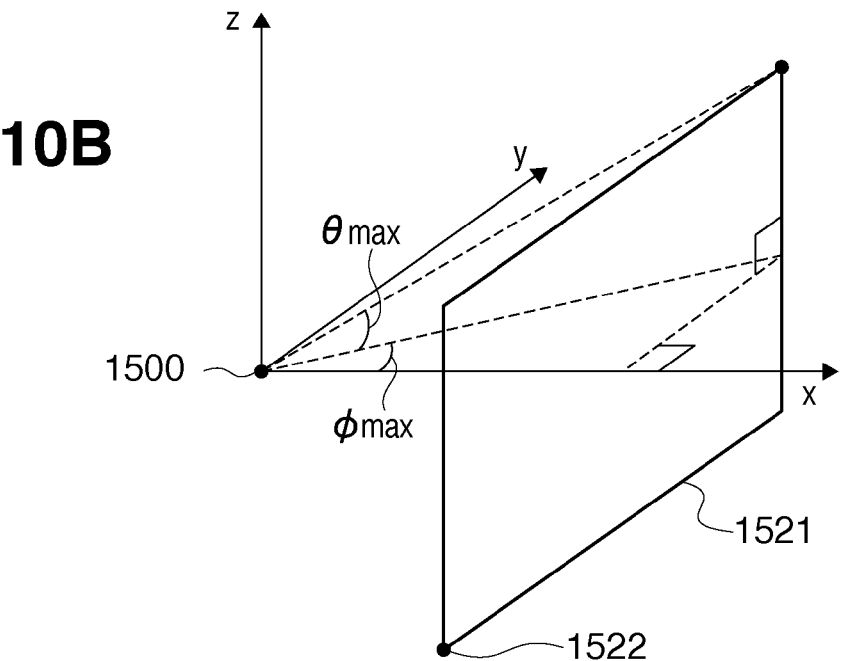
Figure 10C:
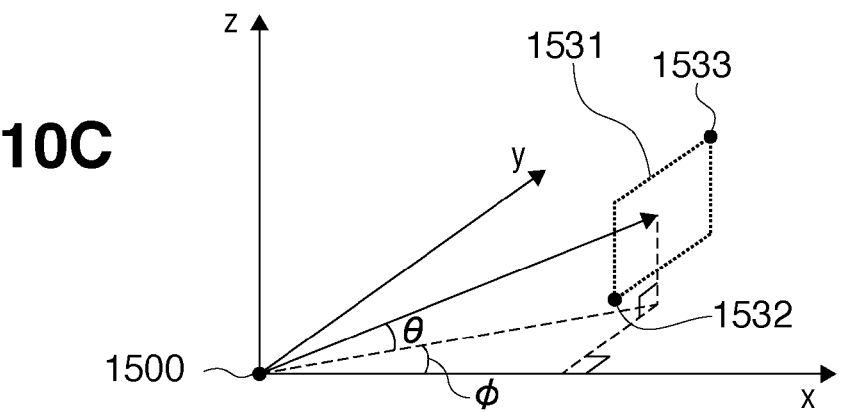

FIGS. 10A to 10C are exemplary illustrative diagrams of a panoramic coordinate calculation method according to the present embodiment. A calculation method of a spatial coordinate of an imaging element inside the image capturing apparatus 130 will now be described with reference to FIG. 10A. Let a lens center position of the image capturing apparatus 130 be an origin 1500 and the direction of the optical axis of the lens when the pan-tilt mechanism of the image capturing apparatus 130 is at the center of the movable area thereof be an x axis. In addition, let a horizontal axis perpendicular to the optical axis be a y axis and a vertical axis perpendicular to the optical axis be a z axis. A coordinate system defined in this manner is referred to as a spatial coordinate system, and a coordinate in the spatial coordinate system is referred to as a spatial coordinate.

Assume that a focal distance at the wide angle end be 1, and an imaging element inside the image capturing apparatus 130 in the spatial coordinate system be positioned at a region 1511. In this case, using a zoom relative magnification γ when the wide angle end is at 1× magnification, as well as a horizontal angle of view λ and a vertical angle of view μ of the wide angle end, spatial coordinates of a point 1512 and a point 1513 on the imaging element when the pan-tilt mechanism of the image capturing apparatus 130 is at the center of its movable area may be respectively expressed as:

$$P_{1512}\begin{bmatrix}x\\y\\z\end{bmatrix} = \begin{bmatrix}1\\-\tan(\lambda/2\gamma)\\-\tan(\mu/2\gamma)\end{bmatrix},$$

$$P_{1513}\begin{bmatrix}x\\y\\z\end{bmatrix} = \begin{bmatrix}1\\\tan(\lambda/2\gamma)\\\tan(\mu/2\gamma)\end{bmatrix}.$$

A calculation method of a spatial coordinate of the panorama video 1401 will be described with reference to FIG. 10B. Assume that the panorama video 1401 is positioned at a region 1521 in the spatial coordinate system, and the point 1403 in the panoramic coordinate system is positioned at a point 1522 in the spatial coordinate system. In this case, using a maximum pan angle φmax and a maximum tilt angle θmax, the spatial coordinate of the point 1522 may be expressed as $$P_{1522}\begin{bmatrix}x\\y\\z\end{bmatrix} = \begin{bmatrix}1\\-\cos(\theta_{max})\sin(\phi_{max})\\-\sin(\theta_{max})\end{bmatrix}$$

A calculation method of a spatial coordinate of the shooting region 1402 will be described with reference to FIG. 10C. Assume that the shooting region 1402 is positioned at a region 1531 in the spatial coordinate system, and points 1404 and 1405 in the panoramic coordinate system are respectively positioned at points 1532 and 1533 in the spatial coordinate system. Generally, it is known that three-dimensional rotation matrices for y-axis rotation and z-axis rotation can respectively be expressed as $$R_y(\phi) = \begin{bmatrix} \cos\phi & 0 & -\sin\phi \\ 0 & 1 & 0 \\ \sin\phi & 0 & \cos\phi \end{bmatrix},$$

$$R_z(\theta) = \begin{bmatrix} \cos\theta & -\sin\theta & 0 \\ \sin\theta & \cos\theta & 0 \\ 0 & 0 & 1 \end{bmatrix}.$$

Therefore, the spatial coordinates of points 1532 and 1533 may respectively be expressed as $$P_{1532}\begin{bmatrix} x \\ y \\ z \end{bmatrix} = R_z(\theta)R_y(\phi)\begin{bmatrix} 1 \\ -\tan(\lambda/2\gamma) \\ -\tan(\mu/2\gamma) \end{bmatrix},$$

$$P_{1533}\begin{bmatrix} x \\ y \\ z \end{bmatrix} = R_z(\theta)R_y(\phi)\begin{bmatrix} 1 \\ \tan(\lambda/2\gamma) \\ \tan(\mu/2\gamma) \end{bmatrix}.$$

As a result, the panoramic coordinates of points 1404 and 1405 may be expressed as $$P_{1404}\begin{bmatrix} X \\ Y \end{bmatrix} = P_{1532}\begin{bmatrix} y \\ z \end{bmatrix} - P_{1522}\begin{bmatrix} y \\ z \end{bmatrix} =$$

$$\begin{bmatrix} \cos\theta_{max}\sin\phi_{max} + \sin\theta\cos\phi - \cos\theta\tan(\lambda/2\gamma) + \\ \sin\theta\sin\phi\tan(\mu/2\gamma) \\ \sin\theta_{max} + \sin\phi - \cos\phi\tan(\mu/2\gamma) \end{bmatrix},$$

$$P_{1405}\begin{bmatrix} X \\ Y \end{bmatrix} = P_{1533}\begin{bmatrix} y \\ z \end{bmatrix} - P_{1522}\begin{bmatrix} y \\ z \end{bmatrix} =$$

$$\begin{bmatrix} \cos\theta_{max}\sin\phi_{max} + \sin\theta\cos\phi + \cos\theta\tan(\lambda/2\gamma) - \\ \sin\theta\sin\phi\tan(\mu/2\gamma) \\ \sin\theta_{max} + \sin\phi + \cos\phi\tan(\mu/2\gamma) \end{bmatrix},$$

thereby enabling the position of the shooting region 1402 in the panoramic coordinate system to be expressed using imaging control information.

Returning now to FIG. 8, in step S1302, the calculating unit 108 determines the presence/absence of a setting of an existing detection region. When it is determined that a detection region has been set ("YES" in step S1302), the method proceeds to step S1303. When it is determined that a detection region has not been set ("NO" in step S1302), the method proceeds to step S1304.

In step S1303, the calculating unit 108 calculates an overlapping area of the existing detection region and the shooting region 1402, and resets the overlapping area as a detection region at the time of video shooting. The existing detection region is a specified region specified by the user.

Once again referring to FIG. 9, a calculation method of an overlapping area will be described. The calculating unit 108 acquires panoramic coordinates of the top left point 1404 and the bottom right point 1405 of the current shooting region 1402 calculated in step S1301. For simplicity, let (X, Y)=(A, B) be the panoramic coordinates of the point 1404 and (X, Y)=(C, D) be the panoramic coordinates of the point 1405. A detection region 1406 is a region based on a specification by the user 150. A region covering an entrance that is a shooting subject has been specified. Let (X, Y)=(E, F) be the panoramic coordinates of a top left point 1407 of the detection region 1406 and (X, Y)=(G, H) be the panoramic coordinates of a bottom right point 1408 of the detection region 1406.

In this case, an overlapping region of the shooting region 1402 and the detection region 1406 exists if both max(A, E)≦min(G, C) and max(B, F)≦min(H, D) are satisfied, where max(m, n) is a function that returns a maximum value among two numerals m and n, and min(m, n) is a function that returns a minimum value among two numerals m and n. The panoramic coordinates of a top left point of the overlapping region may be expressed as (max(A, E), max(B, F)), while the panoramic coordinates of a bottom right point of the overlapping region may be expressed as (min (G, C), min (H, D)). As a result, a portion of the detection region 1406 protruding outside of the area of the shooting region 1402 can be removed from the detection region. The overlapping region obtained as described above is to be reset as the detection region.

Returning now to FIG. 8, in step S1304, the calculating unit 108 determines whether the shooting region 1402 has changed or not. The calculating unit 108 determines that no changes have occurred in the shooting region due to camera control when the sum of differential absolute values of the panoramic coordinates of points 1404 and 1405 at time T at the time of shooting and time T−1 is smaller than a threshold Th or, in other words, if

|A(T)−A(T−1)|+|B(T)−B(T−1)|+|C(T)−C(T−1)|+|D(T)−D(T−1)|<Th is true, where A(t), B(t), C(t), and D(t) respectively denote coordinate values A, B, C, and D at time t. On the other hand, it is determined that a change has occurred in the shooting region when the sum of differential absolute values is equal to or greater than the threshold Th or, in other words, if

|A(T)−A(T−1)|+|B(T)−B(T−1)|+|C(T)−C(T−1)|+|D(T)−D(T−1)|≦Th is true. When it is determined that a change has occurred ("YES" in step S1304), the method proceeds to step S1305, and when it is determined that a change has not occurred ("NO" in step S1304), the method is terminated.

In step S1305, the calculating unit 108 calculates a region newly entering the shooting region from time T−1 to time T, and sets the region as a detection region. The calculating unit 108 compares R(T) calculated in step S1301 and R(T−1) stored in the RAM 202 or the like, where R(t) denotes the shooting region at time t. Coordinates of a portion of R(T) not included in R(T−1) are calculated and set as a new detection region.

Figure 11:
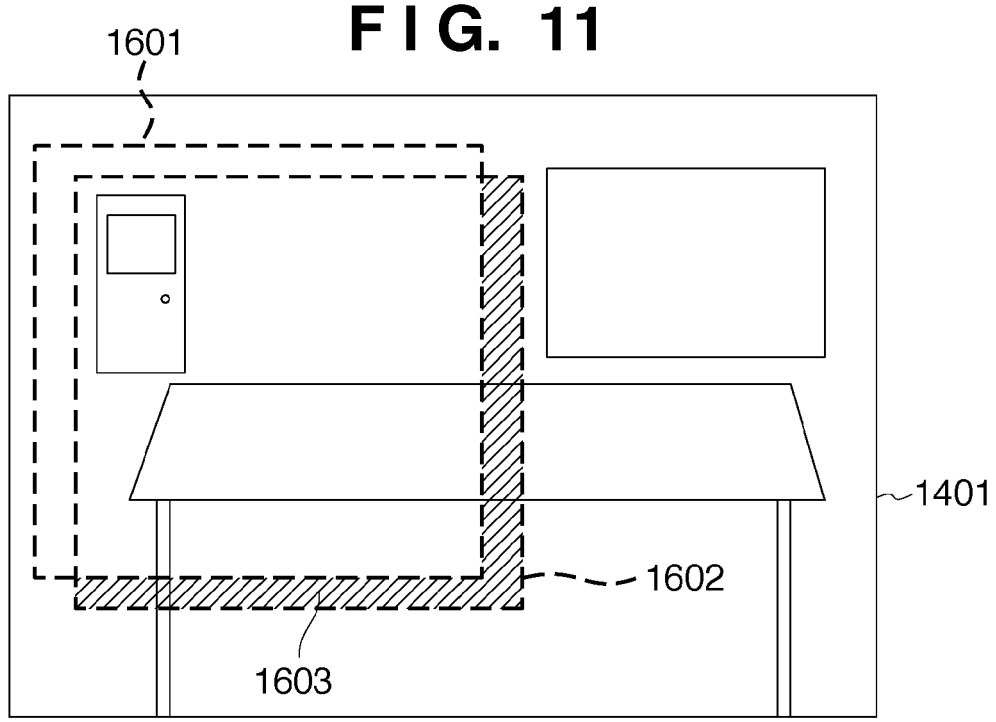
FIG. 11 is an exemplary illustrative diagram of a case where a shot region has moved downward to the right according to the second embodiment of the present invention.

A specific example of a new detection region will now be described in detail with reference to FIG. 11. FIG. 11 is an exemplary illustrative diagram of a case where a shooting region has moved downward to the right from time T−1 to time T. A region 1601 represents a video region at time T−1 or R(T−1), and a region 1602 represents a video region at time T or R(T). In this case, a region included in R(T) but not in R(T−1) or, in other words, a hatched region 1603 is set as a new detection region. The region 1603 may be set in any way. For example, coordinates of the respective vertices of the region 1603 may be set, or flags may be set at bits included in the region 1603 in a bitmap that manages the panoramic coordinates.

Figure 12:
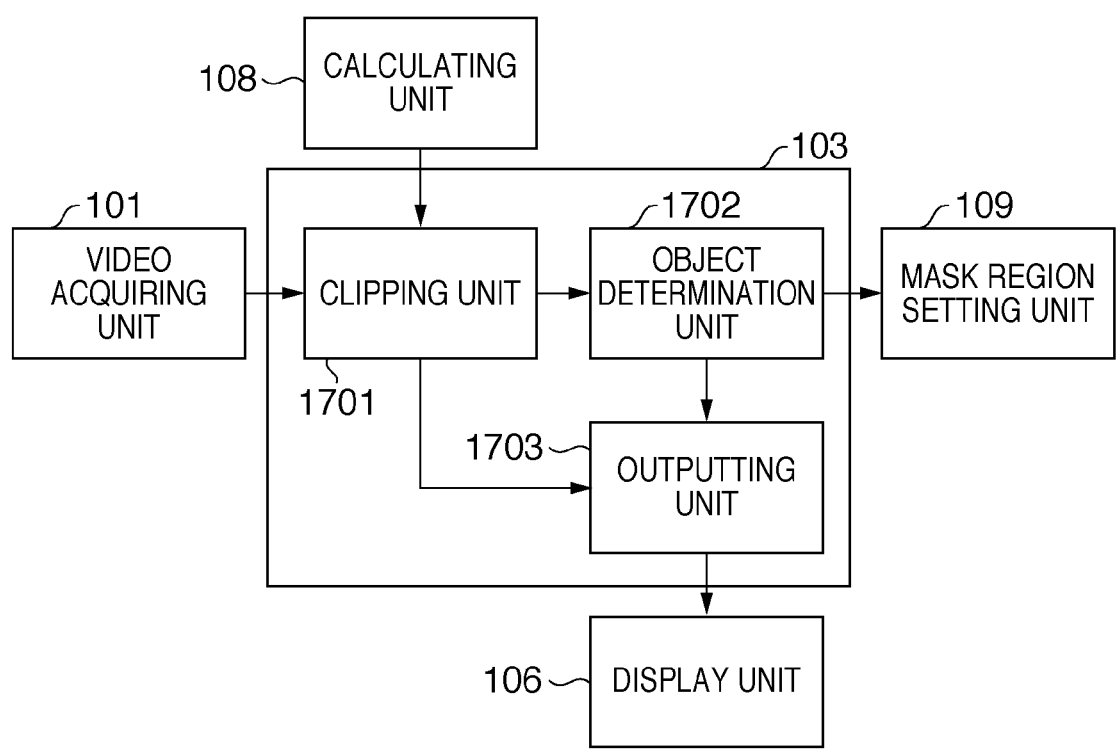
FIG. 12 is a detailed exemplary functional block diagram of a detecting unit 103 according to the second embodiment of the present invention.

Next, details of the object detection processing to be executed in step S502 in FIG. 4 will be described with reference to FIGS. 12 and 13. FIG. 12 is a detailed exemplary functional block diagram of the detecting unit 103 according to the present embodiment. Functions described in the first embodiment shall be omitted. The detecting unit 103 includes a clipping unit 1701, an object determination unit 1702, and an outputting unit 1703.

The clipping unit 1701 clips a region set as a detection region among a video acquired by the video acquiring unit 101, and outputs the same to the object determination unit 1702. The object determination unit 1702 compares the region clipped by the clipping unit 1701 with a background video of a panorama video acquired in advance to determine whether an object exists or not. Details of the determination will be provided later. Based on a detection result of the object determination unit 1702, the outputting unit 1703 outputs a region including the object as a highlighted region to the display unit 106.

Object detection processing will be described in further detail with reference to FIG. 13. FIG. 13 is an exemplary illustrative diagram of clipping of an object according to the present embodiment. A video 1800 is a video at time T acquired by the video acquiring unit 101. A region 1801 is a detection region specified by the user 150. A region 1802 is a region that had newly become a detection region at time T due to the movement of the shooting area. Due to the change of the shooting area at time T, an object 1803 that is a person is now included in the shooting region.

The clipping unit 1701 clips the detection region 1801 and the detection region 1802 from the video 1800. The object determination unit 1702 then calculates differences between the clipped regions and a background video acquired in advance. The object determination unit 1702 determines that the object 1803 is included in a detection region when the difference exceeds a threshold.

As a result, as depicted in a video 1810, a region 1804 including the object 1803 is set as a mask region and masking is performed thereon. As shown, the method of comparing a region with a background video acquired in advance enables an object included in a detection region to be set so as not to be displayed even when the object is not moving.

Next, details of step S506 shown in FIG. 4 will be described. In addition to operations described in the first embodiment, the tracking unit 110 performs motion compensation on a mask region based on imaging control information.

For example, let (U1, V1) be a movement vector of the center of a shooting region from time T−1 to time T, and L1 be a horizontal direction magnification factor and L2 be a vertical direction magnification factor of the shooting region. In this case, assuming that panoramic coordinates of a top left point of the shooting region is denoted by (X, Y)=(A, B) and panoramic coordinates of the bottom right point 1405 thereof is denoted by (X, Y)=(C, D), U1, V1, L1, and L2 may be calculated from the panoramic coordinates of time T and time T−1 as $$U1=(A(T)+C(T))-(A(T-1)+C(T-1))/2,$$

$$V1=(B(T)+D(T))-(B(T-1)+D(T-1))/2,$$

$$L1=(C(T)-A(T))/(C(T-1)-A(T-1)),$$

$$L2=(D(T)-B(T))/(D(T-1)-B(T-1)).$$

Now, let (P, Q) be coordinates of the center of a mask region within a shooting screen at time T−1, and S1, S2 respectively be horizontal and vertical lengths of the mask region. In this case, the coordinates of the center of the mask region within the shooting screen at time T after being subjected to movement compensation can be calculated as (P−U1, Q−V1). In addition, the horizontal and vertical lengths of the mask region at time T after movement compensation can be respectively calculated as S1/L1 and S2/L2. By correcting the position and size of a mask region before performing pattern matching using the aforementioned method, tracking accuracy can be enhanced.

As described above, according to the present embodiment, even when a shooting area of an image capturing apparatus is changed during shooting, an object desirably not displayed at a transmission destination can be arranged so as not to be displayed.

While the transmission apparatus 100 according to the present embodiment is arranged so as to acquire a background video of a panorama video in advance, the present invention is not limited to such an arrangement. For example, a background video may be created during video transmission by piecing medians of pixel values of respective pixels at the same pixel position in a predetermined number of temporally consecutive frames in video data acquired by the video acquiring unit 101 as pixel values at the same pixel position of the background video.

Figure 14:
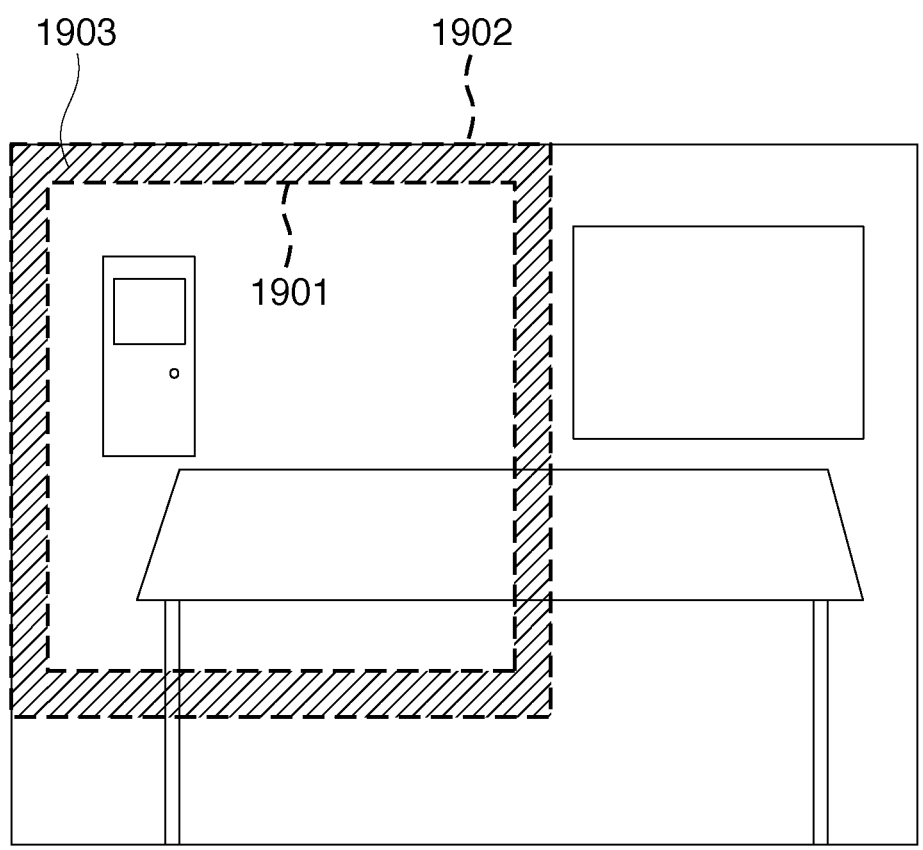
FIG. 14 is an exemplary illustrative diagram of a case where a shooting area is zoomed out according to the second embodiment of the present invention.

While the present embodiment has been described using an example in which the shooting region of the image capturing apparatus 130 moves downward to the right, regions newly included in the shooting region may be similarly calculated even when the shooting region moves in other directions or when the size of the shooting region changes due to zooming. For example, FIG. 14 is an exemplary illustrative diagram of a video in a case where the shooting area is zoomed out. A region 1901 is a video at time T−1 and a region 1902 is a video at time T. It is shown that the shooting area has expanded due to the zooming out of the image capturing apparatus 130. In this case, a hatched region 1903 newly becomes a detection region.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-287177, filed Nov. 7, 2008, which is hereby incorporated by reference herein in its entirety.

What is claimed is:

1. An apparatus for editing an image to be displayed on a display apparatus, comprising:
   an inputting unit for inputting a shot image;
   a detecting unit for detecting a change in the shot image; and
   an editing unit for editing the shot image so as to prevent a region corresponding to the detected change from being displayed on the display apparatus.

2. The apparatus according to claim 1, wherein said editing unit moves a region to be edited so as to follow a movement of the region corresponding to the detected change.

3. The apparatus according to claim 1, wherein said detecting unit detects a change in a predetermined region in the shot image.

4. The apparatus according to claim 1, wherein when a shooting area is changed, said detecting unit detects a change in an area newly included in the shooting area.

5. The apparatus according to claim 1, wherein said detecting unit includes a specifying unit that specifies a region included in a shot first image, and when the shooting area is changed, said detecting unit detects a change in a region included in a second image shot after the change in the shooting area and which corresponds to a region included in the first region.

6. The apparatus according to claim 1, wherein said editing unit includes a storing unit that stores a shot image, and said editing unit replaces the region with a corresponding region in the image stored in said storing unit.

7. A method of editing an image to be displayed on a display apparatus, comprising the steps of:
   inputting a shot image;
   detecting a change in the shot image; and
   editing the shot image so as to prevent a region corresponding to the detected change from being displayed on the display apparatus.

8. The method according to claim 7, wherein said editing step includes a step of moving a region to be edited so as to follow a movement of the region corresponding to the detected change.

9. The method according to claim 7, wherein said detecting step includes a step of detecting a change in a predetermined region in the shot image.

10. The method according to claim 7, wherein said detecting step includes a step of detecting, when a shooting area is changed, a change in an area newly included in the shooting area.

11. The method according to claim 7, wherein said detecting step includes a specifying step in which a region included in a shot first image is specified, and when the shooting area is changed, a change in a region included in a second image shot after the change in the shooting area and which corresponds to a region included in the first region is detected in said detecting step.

12. The method according to claim 7, wherein said editing step includes a storing step in which a shot image is stored, and the region is replaced in said editing step with a corresponding region in the stored image.

13. A non-transitory computer-readable storage medium storing a computer program for a computer that edits an image to be displayed on a display apparatus, said program causing the computer to carry out the steps of:
   inputting a shot image;
   detecting a change in the shot image; and
   editing the shot image so as to prevent a region corresponding to the detected change from being displayed on the display apparatus.

14. The storage medium according to claim 13, wherein said editing step includes a step of moving a region to be edited so as to follow a movement of the region.

15. The storage medium according to claim 13, wherein said detecting step includes a step of detecting a change in a predetermined region in the shot image.

16. The storage medium according to claim 13, wherein said detecting step includes a step of detecting, when a shooting area is changed, a change in an area newly included in the shooting area.

17. The storage medium according to claim 13, wherein said detecting step includes a specifying step in which a region included in a shot first image is specified, and when the shooting area is changed, a change in a region included in a second image shot after the change in the shooting area and which corresponds to a region included in the first image is detected in said detecting step.

18. The storage medium according to claim 13, wherein said editing step includes a storing step in which a shot image is stored, and the region is replaced in said editing step with a corresponding region in the stored image.

19. An apparatus for changing an image to be displayed on a display apparatus, comprising:
   an inputting unit for inputting an image shot by a camera;
   a detecting unit for detecting an object in the input image;
   a changing unit for changing the input image so as to prevent the detected object from being displayed on the display apparatus; and
   a limiting unit for setting a limited region in the input image such that an object in the limited region is prevented from being displayed on the display apparatus, and when the shooting region of the camera changes, updating the limited region so as to include a region that is included in the shooting region after the change and that is not included in the shooting region before the change.

20. The apparatus according to claim 19, wherein said changing unit moves a region to be changed so as to follow a movement of the detected object.

21. The apparatus according to claim 19, wherein said changing unit includes a storing unit that stores a shot image, and said changing unit replaces the detected object with a corresponding region in the image stored in said storing unit.

22. A method of changing an image to be displayed on a display apparatus, comprising the steps of:
   inputting an image shot by a camera;
   detecting an object in the input image;
   changing the input image so as to prevent the detected object from being displayed on the display apparatus;
   setting a limited region in the input image such that an object in the limited region is prevented from being displayed on the display apparatus; and
   updating, when the shooting region of the camera changes, the limited region so as to include a region that is included in the shooting region after the change and that is not included in the shooting region before the change.

23. The method according to claim 22, wherein said changing step includes a step of moving a region to be changed so as to follow a movement of the detected object.

24. The method according to claim 22, wherein said changing step includes a storing step in which a shot image is stored, and the detected object is replaced in said changing step with a corresponding region in the stored image.

25. A non-transitory computer-readable storage medium storing a computer program for a computer that changes an image to be displayed on a display apparatus, said program causing the computer to carry out the steps of:
　　inputting an image shot by a camera;
　　detecting an object in the input image;
　　changing the input image so as to prevent the detected object from being displayed on the display apparatus;
　　setting a limited region in the input image such that an object in the limited region is prevented from being displayed on the display apparatus; and
　　updating, when the shooting region of the camera changes, the limited region so as to include a region that is included in the shooting region after the change and that is not included in the shooting region before the change.

26. The storage medium according to claim 25, wherein said changing step includes a step of moving a region to be changed so as to follow a movement of the detected object.

27. The storage medium according to claim 25, wherein said changing step includes a storing step in which a shot image is stored, and the detected object is replaced in said changing step with a corresponding region in the stored image.

\* \* \* \* \*